(12) United States Patent
Szenczi-Molnar

(10) Patent No.: US 12,076,641 B2
(45) Date of Patent: Sep. 3, 2024

(54) METHOD AND APPARATUS FOR PROVIDING A COMPUTER IMPLEMENTED GAME

(71) Applicant: KING.COM LTD., St. Julians (MT)

(72) Inventor: Attila Szenczi-Molnar, Malmo (SE)

(73) Assignee: KING.COM LIMITED, St. Julians (MT)

( * ) Notice: Subject to any disclaimer, the term of this patent is extended or adjusted under 35 U.S.C. 154(b) by 0 days.

(21) Appl. No.: 17/091,637

(22) Filed: Nov. 6, 2020

(65) Prior Publication Data

US 2021/0138343 A1 May 13, 2021

Related U.S. Application Data

(60) Provisional application No. 62/931,992, filed on Nov. 7, 2019.

(51) Int. Cl.
*A63F 13/537* (2014.01)
*A63F 13/42* (2014.01)

(52) U.S. Cl.
CPC ............ *A63F 13/537* (2014.09); *A63F 13/42* (2014.09)

(58) Field of Classification Search
CPC ........ A63F 13/42; A63F 13/537; A63F 13/69; A63F 13/85; A63F 13/847
See application file for complete search history.

(56) References Cited

U.S. PATENT DOCUMENTS

| | | | | |
|---|---|---|---|---|
| 2006/0046849 A1* | 3/2006 | Kovacs | ............... | G07F 17/3209 463/39 |
| 2013/0281201 A1* | 10/2013 | Kosuge | ................... | A63F 13/45 463/29 |
| 2014/0055231 A1* | 2/2014 | Amron | ..................... | G07C 9/29 340/5.6 |
| 2015/0265910 A1* | 9/2015 | Campbell | ............... | A63F 13/30 463/10 |

OTHER PUBLICATIONS

Overcooked 2 Gameplay Walkthrough Part 1—Nintendo Switch ( No Commentary ), video, uploaded by XCageGame on Aug. 6, 2018 https://www.youtube.com/watch?v=jTrenjZDtA&t=4s (Year: 2018).*
"Stars to Unlock", dated Jan. 12, 2018, https://overcooked.fandom.com/wiki/Stars_to_Unlock?oldid=208 (Year: 2018).*
Overcooked 2: How to Play Online Co-Op Multiplayer, by Tom Hopkins, published on Aug. 7, 2018 https://twinfinite.net/2018/08/overcooked-2-online-co-op-multiplayer-how/ (Year: 2018).*

* cited by examiner

*Primary Examiner* — James S. McClellan
*Assistant Examiner* — Ross A Williams
(74) *Attorney, Agent, or Firm* — Saul Ewing LLP

(57) ABSTRACT

A computer device has a display which displays game elements of a level of a computer implemented game. The computer implemented game has the level and at least one other level which are associated with a group goal. At least one processor determines using game data associated with a move made by the user a first contribution to the goal. The processor determines using game data associated with a corresponding move by one or more other users a second contribution. The processor based on the first and second contributions of one or more moves if the group goal is satisfied.

23 Claims, 11 Drawing Sheets

Figure 10

- S1 User interface receives input from a user selecting a common enemy level
- S2 Display selected level
- S3 User input received to make a move
- S4 Determine a value associated with the move
- S5 Retrieve information about game play for other users of the team
- S6 Determine a health value for the common enemy using the determined value and at least a part of the retrieved information and display an updated health value
- S7 Determine if any more moves left
  - yes → S8 Determine if the common enemy is defeated
    - yes → S10 Display information indicating common enemy defeated
    - no → (back to S3)
  - no → S8 Determine if the common enemy is defeated
    - no → S9 Display information indicating next level to fight the same enemy

METHOD AND APPARATUS FOR PROVIDING A COMPUTER IMPLEMENTED GAME

CROSS-REFERENCE TO RELATED APPLICATIONS

This application claims priority to U.S. Provisional Application No. 62/91,992, filed on Nov. 7, 2019, the entire contents of which being fully incorporated herein by reference.

FIELD OF THE INVENTION

Some embodiments relate to a user device for use in playing a computer implemented game. Some embodiments relate to a computer implemented method for providing a computer implemented game.

Some embodiments may relate to engaging users or players in a computer game executable in an online environment and/or an offline environment.

BACKGROUND OF THE INVENTION

Casual computer implemented games are known where there are many different levels which a user can play.

One technical challenge with such games is how to provide technical complexity of a game whilst at the same time providing a varied gaming experience for the user.

Another technical challenge is how to retain casual game play where a user is able to play a game as and when they like while at the same time having an aspect which involves interaction with one or more other players.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device comprising: display configured to display game elements of a level of a computer implemented game, the computer implemented game comprising a plurality of different levels, the level of the computer implemented game being associated with a group goal; a user interface configured to detect user input when a user engages with one or more game elements in a move of the level; a receiver configured to receive game data for one or more other users, the game data being associated with game play of the one or more other users playing the level of the computer implemented game; and at least one processor configured to: a) in response to user input received via the user interface engaging with one or more game elements in a move, determine a first contribution to the group goal from game data associated with the move; b) determine, based on the received game data, a second contribution to the group goal by the one or more other users from a move corresponding to the move made by the user; and repeat steps a) and b) in response to user input received via the user interface engaging with one or more game elements in a next move of the level until one or more level conditions are satisfied, wherein the at least one processor is configured to determine based on the first and second contributions of one or more moves if the group goal is satisfied.

The at least one processor may be configured to update a goal value based on the first and second contribution.

The at least one processor may be configured to determine if the group goal is satisfied in dependence on the updated goal value.

The at least one processor may be configured to determine that the group goal is satisfied when the updated goal value reaches a given value.

The at least one processor may be configured to determine a value associated with a move made by the user; update a cumulative value using the determined value associated with that move; and determine if the updated cumulative value satisfies a condition, and if so to update a goal value associated with the group goal.

The at least one processor may be configured to update the goal value using one or more values associated with the one or more other users.

The condition may be that the cumulative value has reached a given value.

The at least one processor may be configured to cause the display to display group goal progress information and to cause the displayed goal progress information to be updated in response to contributions of the user and the one or more other users.

The group goal may comprise defeating an enemy.

When the at least one processor determines that the group goal is not satisfied, the at least one processor may be configured to cause the display to display information indicating a next level of the plurality of levels which is associated with the group goal The computer device may comprise at least one memory, and when the at least one processor determines that the group goal is not satisfied, the at least one processor may be configured to store a contribution value in the at least one memory, the at least one processor being configured to use the stored contribution value in a next level associated with the group goal together with contributions from one or more moves made by the user and the one or more other users in the next level when determining if the group goal is satisfied during play of the next level.

The at least one processor may be configured to cause the display to display information about a plurality of different levels and a respective indication of which one or more of the plurality of different levels is associated with the group goal.

The information indicating the next level may comprise information indicating a number of levels which the user needs to play to reach the next level which is associated with the group goal The game data may comprise respective contribution information for the one or more other users.

The at least one processor may be configured to determine that the group goal is satisfied, and in response to cause the display to display information indicating that group goal is satisfied.

The at least one processor may be configured to determine that the group goal is satisfied, and in response to provide a game reward.

According to an aspect, there is provided a computer implemented method performed in a computer device configured to provide a computer implemented game, the computer implemented game comprising a plurality of different levels, at least one level of the plurality of different levels being associated with a group goal, the method comprising: displaying on a display of the computer device game elements of a level associated with the group goal of the computer implemented game; detecting user input received via a user interface of the computer device when a user engages with one or more game elements in a move of the level; receiving, by a receiver of the computer device, game data for one or more other users, the game data being associated with game play of the one or more other users playing the level of the computer implemented game; determining by at least one processor of the computer device: a) in response to user input received via the user interface engaging with one or more game elements in a move, a first contribution to the group goal using game data associated with a move made by the user when playing the level; b) based on the received game data, a second contribution to the group goal by the one or more other users from a move corresponding to the move made by the user; and repeating steps a) and b) in response to user input received via the user interface engaging with one or more game elements in a next move of the level until one or more level conditions are satisfied, wherein the method comprises determining by the at least one processor based on the first and second contributions of one or more moves if the group goal is satisfied.

The method may comprise updating by the at least one processor is configured a goal value based on the first and second contribution.

The method may comprise determining by the at least one processor a value associated with a move made by the user; updating by the at least one processor a cumulative value using the determined value associated with that move; and determining by the at least one processor if the updated cumulative value satisfies a condition, and if so to update a goal value associated with the group goal.

The method may comprise causing by the at least one processor the display to display group goal progress information and causing the displayed goal progress information to be updated in response to contributions of the user and the one or more other users.

The group goal may comprise defeating an enemy.

The method may comprise when the at least one processor determines that the group goal is not satisfied, causing the display to display information indicating a next level of the plurality of levels which is associated with the group goal When the at least one processor determines that the group goal is not satisfied, the method may comprise storing in at least one memory of the computer device by the at least one processor a contribution, using by the at least one processor the stored contribution value in a next level associated with the group goal together with contributions from one or more moves made by the user and the one or more other users in the next level when determining if the group goal is satisfied during play of the next level.

The method may comprise causing by the at least one processor the display to display information about a plurality of different levels and a respective indication of which one or more of the plurality of different levels is associated with the group goal. The method may comprise determining by the at least one processor that the group goal is satisfied, and in response causing the display to display information indicating that group goal is satisfied.

According to an aspect, there is provided a non-transitory computer readable medium encoded with instructions for controlling a computing device configured to provide a computer implemented game, the computer implemented game comprising a plurality of different levels, at least one level of the plurality of different levels being associated with a group goal, the computer device comprising at least one processor and on which the instructions are executed to cause the following steps of: displaying on a display of the computer device game elements of a level associated with the group goal of the computer implemented game; detecting user input received via a user interface of the computer device when a user engages with one or more game elements in a move of the level; receiving, by a receiver of the computer device, game data for one or more other users, the game data being associated with game play of the one or more other users playing the level of the computer implemented game; determining by at least one processor of the computer device: a) in response to user input received via the user interface engaging with one or more game elements in a move, a first contribution to the group goal using game data associated with a move made by the user when playing the level; b) based on the received game data, a second contribution to the group goal by the one or more other users from a move corresponding to the move made by the user; and repeating steps a) and b) in response to user input received via the user interface engaging with one or more game elements in a next move of the level until one or more level conditions are satisfied, wherein the method comprises determining by the at least one processor based on the first and second contributions of one or more moves if the group goal is satisfied.

According to an aspect, there is provided a computer device comprising: a display configured to display game elements of a level of a computer implemented game, the computer implemented game comprising a plurality of different levels, the level of the computer implemented game and at least one other level of the plurality of different levels being associated with a goal; a user interface configured to detect user input when a user engages with one or more game elements in a move of the level; and at least one processor configured to: determine using game data associated with one or more moves made by the user a contribution to the goal; determine, based on the contribution, if the goal is satisfied; and when the goal is not satisfied, causing the display to display information indicating a next level of the plurality of levels which is associated with the goal, the contribution of the level being used in combination with a contribution provided when the user plays the next level to determine if the goal is satisfied.

The contribution to a goal may comprise a score or points.

The at least one processor may be configured to update a goal value when a move provides a contribution.

The at least one processor may be configured to use the goal value to determine if the goal is satisfied.

The at least one processor may be configured to compare the goal value to a threshold value to determine if the goal is satisfied.

The at least one processor may be configured to determine that the goal is satisfied when the goal value reaches a given value.

The at least one processor may be configured to determine a value associated with a move as the contribution of that move, to update a contribution value using the determined value associated with the move, to determine if the updated contribution value satisfies a condition, and if so to update a goal value associated with the goal.

The condition may be that the updated contribution value has reached a given value.

The at least one processor may be configured to use the goal value to determine if the goal is satisfied.

The at least one processor may be configured to compare the goal value to a threshold value to determine if the goal is satisfied.

The at least one processor may be configured to determine that the goal is satisfied when the goal value reaches a given value.

The goal may comprise defeating an enemy.

The computer device may comprise at least one memory may be configured to store a value of the contribution of the level and the at least one processor may be configured, when the next level is being played, to determine a contribution from a move of the next level and update the value of the contribution of the level.

The at least one processor may be configured to cause the display to display information about a plurality of different levels and a respective indication of which one or more of the plurality of different levels is associated with the goal.

The at least one processor may be configured to cause the display to display the information about the plurality of different levels in a map.

The respective indication may comprise an indicator provided on the map.

The information indicating the next level may comprise information indicating a number of levels which the user needs to play to reach the next level which is associated with the goal.

The goal may comprise defeating an enemy.

The goal may comprise a common goal shared by the user with one or more other users.

The goal may comprise a defeating an enemy shared by the user with one or more other users.

The computer device may comprise a receiver configured to receive game data for one or more other users, the game data being associated with game play by the one or more other users of a level for the computer implemented game.

At least one memory may be configured to store the received game data.

The game data may comprise contribution information.

The at least one processor may be configured to determine, based on the contribution of the user and a contribution of one or more other users if the common goal is satisfied.

The contribution of the user and the contribution of one or more other users used to determine if the common goal is satisfied may be for the same level.

According to an aspect, there is provided a computer implemented method comprising: displaying, on a display of a user device, game elements of a level of a computer implemented game, the computer implemented game comprising a plurality of different levels, the level of the computer implemented game and at least one other level of the plurality of different levels being associated with a goal; detecting user input, via a user interface of the user device, when a user engages with one or more game elements in a move of the level; determine, by at least one processor of the user device, using game data associated with one or more moves made by the user a contribution to the goal; determine, by the at least one processor, based on the contribution, if the goal is satisfied; and when the goal is not satisfied, causing by the at least one processor, the display to display information indicating a next level of the plurality of levels which is associated with the goal, the contribution of the level being used in combination with a contribution provided when the user plays the next level to determine if the goal is satisfied.

The contribution to a goal may comprise a score or points.

The method may comprise updating, by the at least one processor, a goal value when a move provides a contribution.

The method may comprise using, by the at least one processor, the goal value to determine if the goal is satisfied.

The method may comprise comparing, by the at least one processor, the goal value to a threshold value to determine if the goal is satisfied.

The method may comprise determining, by the at least one processor, that the goal is satisfied when the goal value reaches a given value.

The method may comprise determining, by the at least one processor, a value associated with a move as the contribution of that move, updating, by the at least one processor, a contribution value using the determined value associated with the move, determining, by the at least one processor, if the updated contribution value satisfies a condition, and if so to update a goal value associated with the goal.

The condition may be that the updated contribution value has reached a given value.

The method may comprise using, by the at least one processor, the goal value to determine if the goal is satisfied.

The method may comprise comparing, by the at least one processor, the goal value to a threshold value to determine if the goal is satisfied.

The method may comprise determining, by the at least one processor, that the goal is satisfied when the goal value reaches a given value.

The goal may comprises defeating an enemy.

The method may comprises storing in at least one memory a value of the contribution of the level and determining by the at least one processor, when the next level is being played, a contribution from a move of the next level and updating by the at least one processor the value of the contribution of the level.

The method may comprise causing by the at least one processor, the display to display information about a plurality of different levels and a respective indication of which one or more of the plurality of different levels is associated with the goal.

The method may comprise causing by the at least one processor the display to display the information about the plurality of different levels in a map.

The respective indication may comprise an indicator provided on the map.

The information indicating the next level may comprise information indicating a number of levels which the user needs to play to reach the next level which is associated with the goal The goal may comprise defeating an enemy.

The goal may comprise a common goal shared by the user with one or more other users.

The goal may comprise a defeating an enemy shared by the user with one or more other users.

The method may comprise receiving, by a receiver of the user device, game data for one or more other users, the game data being associated with game play by the one or more other users of a level for the computer implemented game.

The method may comprise storing, in at least one memory of the user device, the received game data.

The game data may comprise contribution information.

The method may comprise determining, by the at least one processor, based on the contribution of the user and a contribution of one or more other users if the common goal is satisfied.

The contribution of the user and the contribution of one or more other users used to determine if the common goal is satisfied may be for the same level.

According to another aspect, there is provided a computer device comprising: a display configured to display game elements of a level of a computer implemented game, the computer implemented game comprising a plurality of different levels, the level of the computer implemented game and at least one other level of the plurality of different levels being associated with a common enemy shared with a plurality of other users; a user interface configured to detect user input when a user engages with one or more game elements in a move of the level; a receiver configured to receive game data for one or more other users, the game data being associated with game play by the one or more other users of the level of the computer implemented game; and at least one processor configured to: determine using game data associated with one or more moves made by the user and the game data for the one or more other users if a criteria associated with the common enemy is together satisfied by game play by both the user and the one or more other users; and when the criteria is not satisfied, causing the display to display information indicating a next level of the plurality of levels which is associated with the enemy.

According to another aspect, there is provided a computer implemented method comprising: display on a display of a user device game elements of a level of a computer implemented game, the computer implemented game comprising a plurality of different levels, the level of the computer implemented game and at least one other level of the plurality of different levels being associated with a common enemy shared with a plurality of other users; detecting user input at a user interface when a user engages with one or more game elements in a move of the level; receiving, by a receiver of the user device, game data for one or more other users, the game data being associated with game play by the one or more other users of the level of the computer implemented game; determining, by at least one processor of the user device, using game data associated with one or more moves made by the user and the game data for the one or more other users if a criteria associated with the common enemy is together satisfied by game play by both the user and the one or more other users; and when the criteria is not satisfied, causing, by the at least one processor, the display to display information indicating a next level of the plurality of levels which is associated with the enemy.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description.

BRIEF DESCRIPTION OF DRAWINGS

To understand some embodiments, reference will now be made by way of example only to the accompanying drawings, in which:

FIG. 10 shows an example a method of some embodiments;

DETAILED DESCRIPTION OF SOME EMBODIMENTS

In the following description of various embodiments, reference is made to the accompanying drawings which form part thereof, and in which is shown by way of illustration various implementations in which embodiments may be utilized. It is to be understood that the other implementations may be utilized, and structural and functional modifications may be made without departing from the scope of the present invention.

Figure 1:
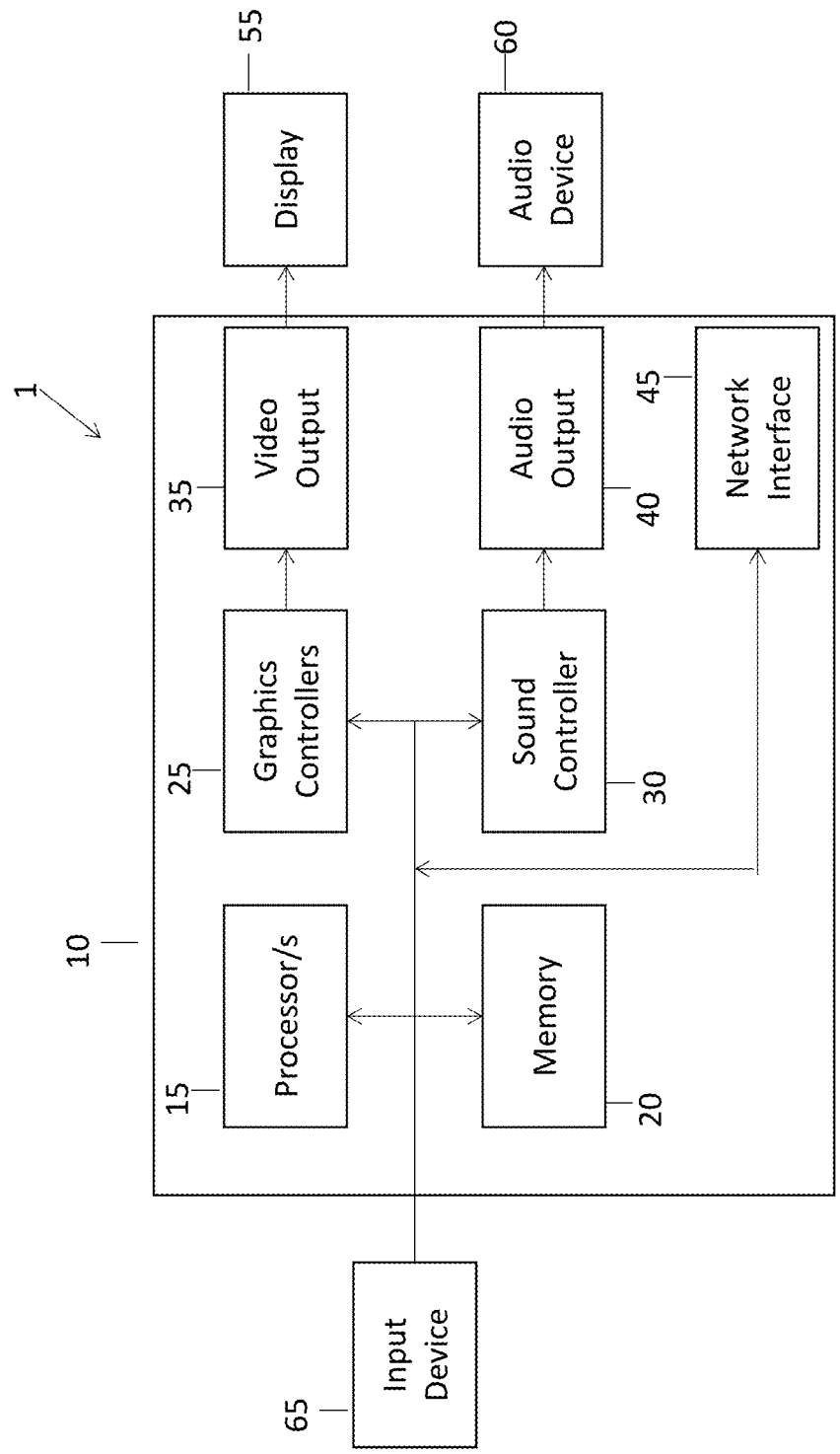
FIG. 1 shows an example user device used for or by some embodiments.

A schematic view of a user device 1 according to an embodiment is shown in FIG. 1. The user device may be any suitable computer device. By way of example only, a computer device may be a mobile phone, a smart phone, a tablet, a laptop computer, a desktop computer or any other suitable computer.

A computer implemented game may be played using the user device. The user device, as will be described in more detail later, is specifically configured to provide the computer implemented game.

All of the blocks shown in FIG. 1 may be implemented by suitable circuitry. The blocks may be implemented in hardware and/or software.

The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise one or more memories and/or may operate in conjunction with the one or more memories 20. Computer executable code may be stored in one or memories and run on one or more of: one or more the one or more processors; the graphics controller; and the sound controller.

The graphics controller 25 is configured to provide a video output 35. The sound controller 30 is configured to provide an audio output 40. The video output 35 is provided to a display 55. The audio output 40 is provided to one or more audio devices 60 such as a speaker and/or earphone(s).

The control part 10 has an interface 45 allowing the device to be able to communicate with a network such as the Internet, wireless network and/or any other suitable communication infrastructure.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 2:
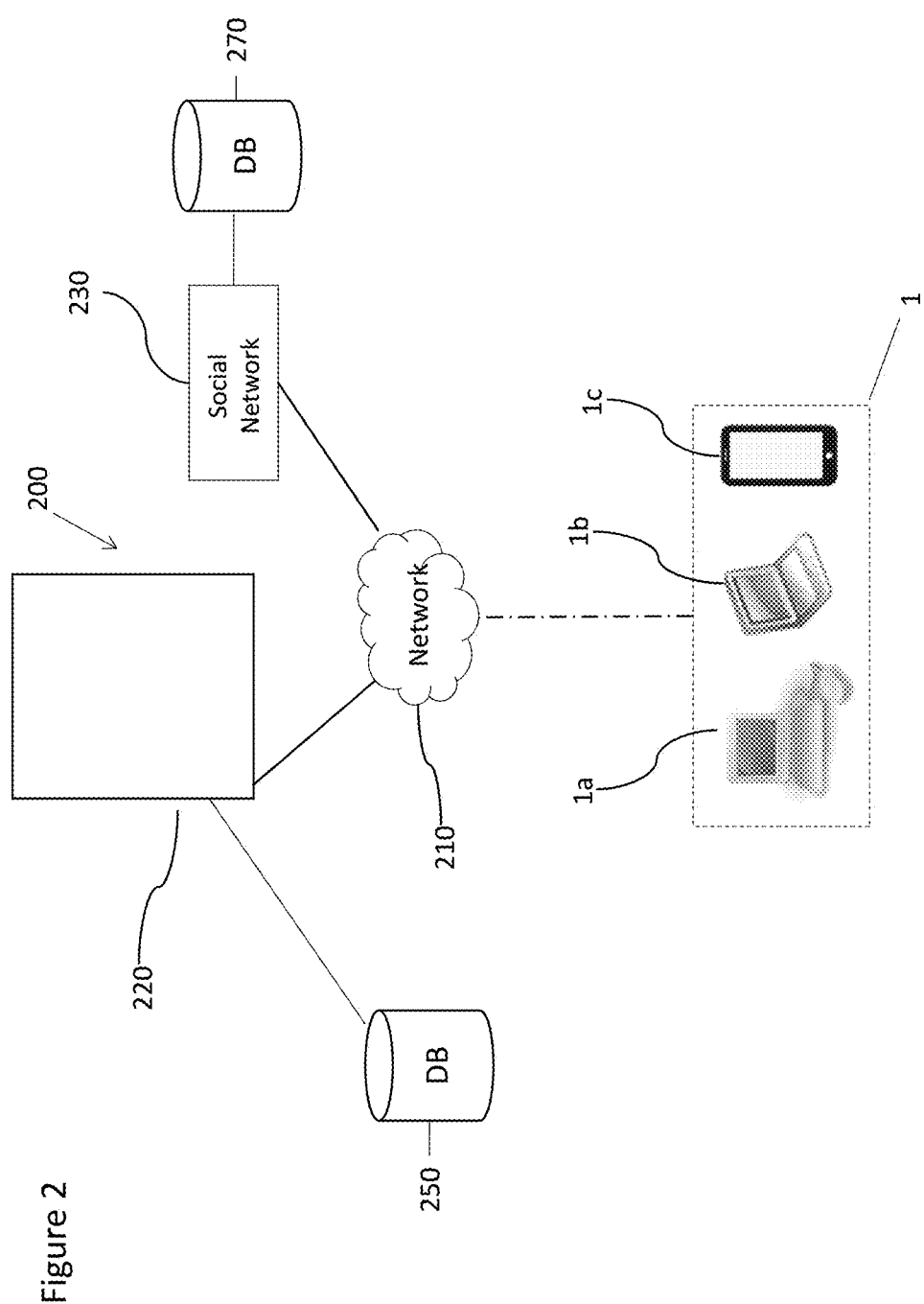
FIG. 2 shows an example system in which some embodiments may be provided.

FIG. 2 schematically shows a system 200 in which some embodiments may be provided. The system 200 comprises a game server 220 which may store or be in communication with database 250 which may, in some embodiments, be connected one or more databases 250. The one or more database may store game player's details, profiles, statistics etc. In practice, one or more game servers 220 may be provided. Where one or more server is provided, the database(s) 250 may be provided in one database 250 across two or more servers. In some embodiments, a single database may be provided. In some embodiments a plurality of databases may be provided.

The game server 220 may communicate via one or more networks such as the internet 210 to one or more client or user devices 1, shown in FIG. 2 by way of example as user devices 1a, 1b and 1c.

Optionally, there may be one or more connections to a social network server 230, for example, Facebook™. The social network server 230 may be connected to a database 270 storing social user interaction details, for instance, user to user interaction maps, friend lists, location history etc. In practice, one or more databases 270 may be provided. The connection to the database 270 of the social network 230 may result in a local copy of a part of the database 270 being made on the user device 1. The social network may be provided by one or more servers.

The one or more game servers 220 and/or one or more user devices may communicate with the social network via the network or in any other suitable way It should be recognised by those skilled in the art that the databases herein referred to may comprise external or remote storage, such as that described as being in a "cloud" or any other suitable storage.

It should be appreciated that embodiments may be deployed using different system architectures. For example, the computer game may be implemented by computer game code that is stored in at least one memory of the user device and is run on at least one processor of the user device. In some embodiments, one or more game servers may handle one or more elements of the computer implemented game in some embodiments.

By way of example only, a Java game applet or other computer game code portion may be provided to the user device and the locally running Java applet or computer code portion will generate, for example, one or more of the graphics, sounds, and support for user interaction for the game play on the user device. Some game data may be fed back to the server to allow interaction with one or more other user devices. The game data which is fed back may alternatively or additionally allow scoring and/or cross platform synchronization.

In some embodiments, the game may be implemented as a computer program that is stored in a memory of the system, for example a game server, and which runs on one or more processors of the game server. Data streams or updates or any suitable data may be supplied to the user device to allow the user device to render and display graphics and sounds in for example a browser of the user device. Such an approach is sometimes referred to as a web services approach. It should be appreciated, however, that such an approach does not necessarily require the use of the Internet.

In some embodiments, the computer implemented game may be played in an offline mode on a handheld device using locally stored information on the handheld device. The user device may store in one or more memories game data for one or more of the levels.

In some embodiments, game state information may be shared between a user device and one more game servers and/or one or more databases. In some embodiments game information for one or more other users may be shared with the user device. This may be via one or more game servers in some embodiments.

One example of a computer implemented game is a 'match-3 game' where the player is required to find patterns on a seemingly chaotic game board. The player has to match three or more of the same type of game element on the game board and those matched elements will then be removed from the game board. In some match games the user has to match more than 3 game elements to make a valid move.

In so called 'clicker' computer implemented games, the player can click on a group of adjacent game elements of a certain type on a game board and those game elements will then be removed from the game board. Some clicker games require two or more adjacent game elements of the same type be removable if clicked on by the user. Others clicker games may require more than two adjacent game elements of the same type in order to make a valid move.

In so called 'switcher' computer implemented games, the player switches round two adjacent game elements on the game board so that one or both of them creates a chain of at least three adjacent game elements of the same type. Those matched game elements will then be removed from the game board. This mechanism can be used in a match 3 type game.

In so called 'slider' computer implemented games the player slides a column or row of game elements on the game board to create a match. Those matched game elements will then be removed from the game board. This mechanism can be used in a match 3 type game.

Another type of computer implemented match game is the so called 'shooter' game where the player launches for example a ball or bubble on to the game board trying to aim at groups of similar game elements already on the game board. If the launched ball hits or forms a group of more than 3 similar game elements then that group of game elements are removed from the game board.

Embodiments may be used with any one of the above games or with any other suitable type of computer implemented game.

Some embodiments may be provided in the context of casual games.

In some embodiments, the computer implemented game may be provided with different levels. One or more levels may have a level goal which needs to be achieved in order for the level to successfully complete. Different levels may have the same or different level goals.

A level goal may be to reach a certain amount of points before running out of moves or time; to bring down one or more certain game elements to the bottom of the game board; to remove a certain number of game elements before running out of moves; and/or to collect one or more certain game elements through specific matches before running out of moves. These are by of example only, and any other additional or alternative level goal may be provided. If the game becomes difficult there are boosters to help the player pass a level. These can be obtained from in-game purchases or received as gifts from friends or earned through game play.

In some games, a user may be required to complete a certain level before the user is able to progress to a next level. In some embodiments, the user may be able to go back and play one or more previous levels.

Figure 3:
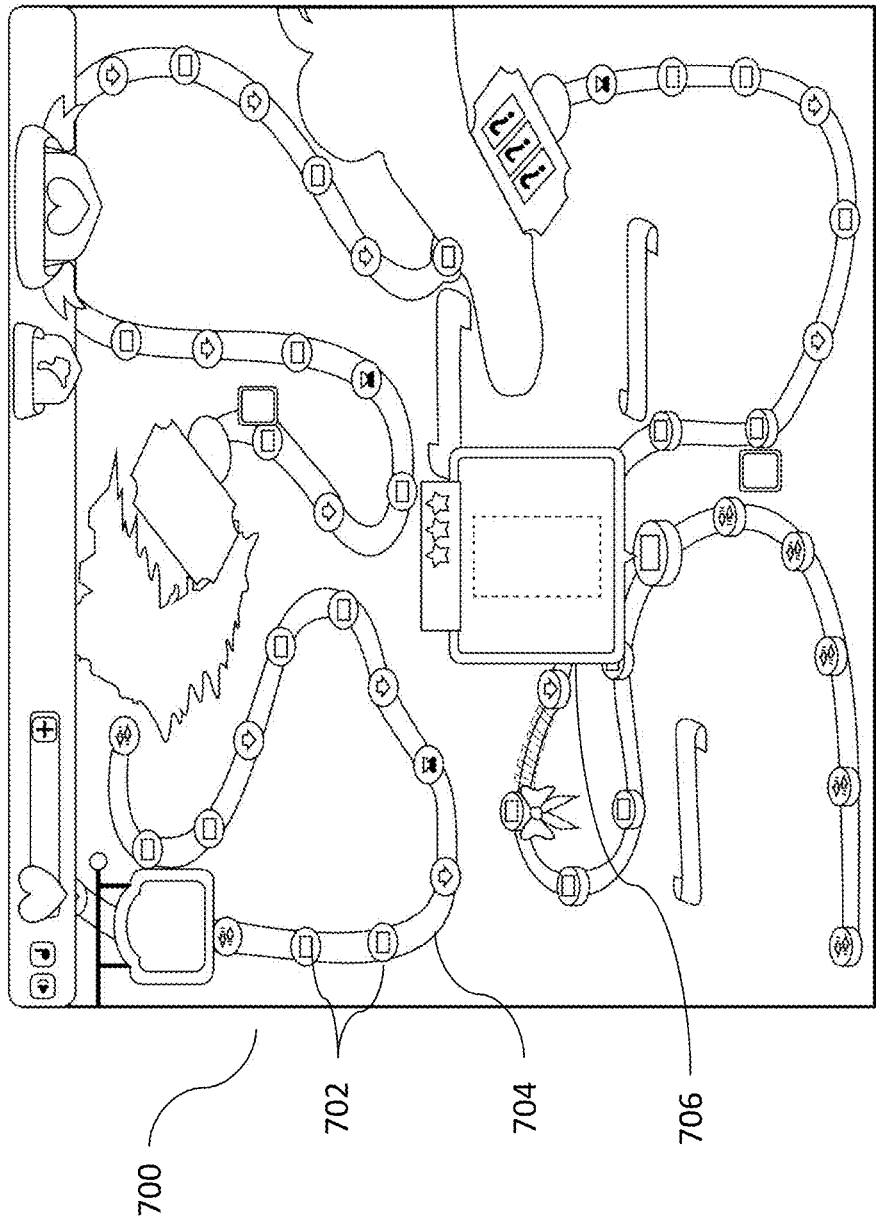
FIG. 3 schematically shows a representation of different levels of a computer implemented game.

In some embodiments, the different levels may be represented on a map 700. FIG. 3 schematically shows one example of such a view which would be displayed on a display. Different levels 702 are represented on a path 704 so that the user can see the progress which he has made playing the game.

This may allow a user to go back and replay levels which he has previously played.

The map view may show what levels have been completed. The map may show levels which yet to be played in a different way to those levels which have been completed.

In some embodiments, the levels are divided up into groups or chapters. These may be referred to as episodes. In some embodiments, there may be a theme associated with each chapter.

In some embodiments, the progress of other users may be viewed on the map. This may be by information provided next to the highest level they have currently reached. The progress of others may alternatively or additionally be provided or by virtual of a league table which can be displayed.

In the map view, the player can hover over a level to display a thumbnail 706 of it. This may make it easier for the user to find a specific already completed level, and/or may give the player an idea of what to expect before actually starting a level. In some embodiments, thumbnails can be displayed for any level. In some embodiments, no thumbnails may be displayed for levels that have not yet been reached. In some embodiments, the thumbnail option is not provided.

Information may be provided on the map to display how well the player has done on the level if he has played it previously. This may for example be represented with the number of stars the player has received on that level, the actual score and/or any other suitable indication. This may optionally be done via a thumbnail option, by displaying information on the map and/or by any other suitable mechanism.

Figure 4:
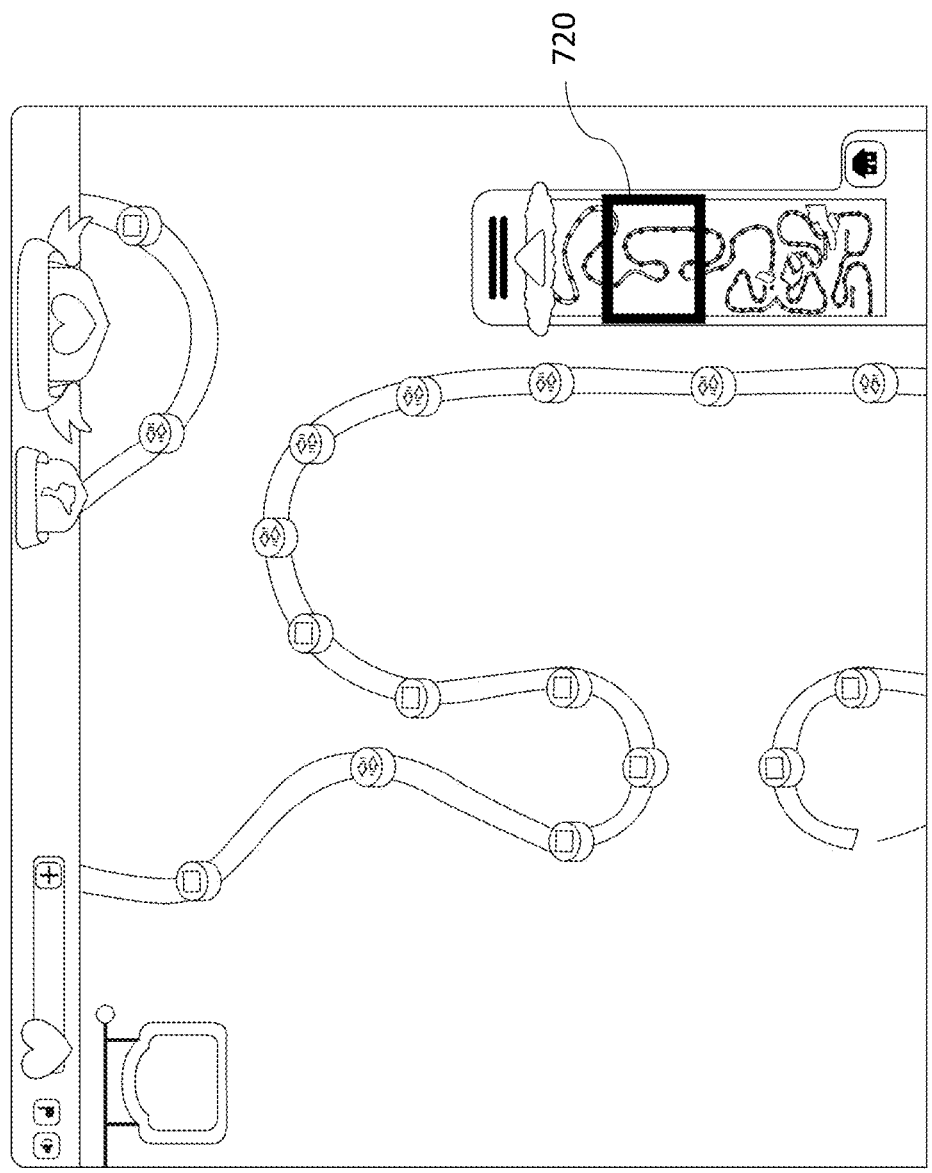
FIG. 4 schematically shows a zoomed in representation of some of the different levels of the computer implemented game.

When navigating on a map in a game, it may sometimes be difficult to find a desired level or area of the map if the map is, for example, too large relative to the size of the display or the part of the display which is available for displaying the map. In some embodiments, a smaller version 720 of the map is displayed, as shown in FIG. 4. The user is able to select a part of that map to be displayed on the display such that the part of the map displayed is larger than when the entire map is displayed. The smaller version of the map will highlight the part of the map which is being displayed in enlarged form.

In some embodiments, the smaller version of the map is only in full view when the player needs it; the rest of the time the smaller version of the map may be hidden with only a small part of it showing. Clicking on this small part will expand the smaller version of the map such as shown in FIG. 4 and referenced 720 and let the player use it. Clicking on the same part again will once more hide the smaller version of the map. When the smaller version of the map is expanded, the player is provided with a mini map showing an area of the map. The player may select a level on the mini map and when doing so the main view will jump to the same location. The player may also scroll through the mini map which may then at the same time scroll the map in the main view.

In some embodiments only a part of the map is displayed on the display. This may be the part of the map around the level which has been most recently played by the user.

In some embodiments, the computer implemented game can be implemented so that a player progresses through multiple levels of changing difficulty. As the player travels through the levels in the computer implemented game, the player's progress may be represented as a journey along a path in the virtual map.

In some embodiments, the player moves between levels and completes the levels one by one along a path by playing the associated game. When the player reaches the level goal of a level, the next level is unlocked and the player can play that next level in the game.

The number of levels may vary depending on the implementation.

The levels may be numbered consecutively throughout the game or they can be numbered within a stage. It is also understood that other ways of identifying the levels can be provided.

In some embodiments, the user can play any of the unlocked levels on the map, so the user can go back and replay already completed levels to get a better score or beat friends' high scores.

The user may progress through a series of levels. The user selects one of a number of levels presented to him on the display via the user interface. The at least one processor determines the level that the user has selected via the user interface and causes the display to display that level as a game board comprising user selectable game elements.

Some embodiments may provide an improved computer device configured by computer code to provide improved user engagement.

Figure 5:
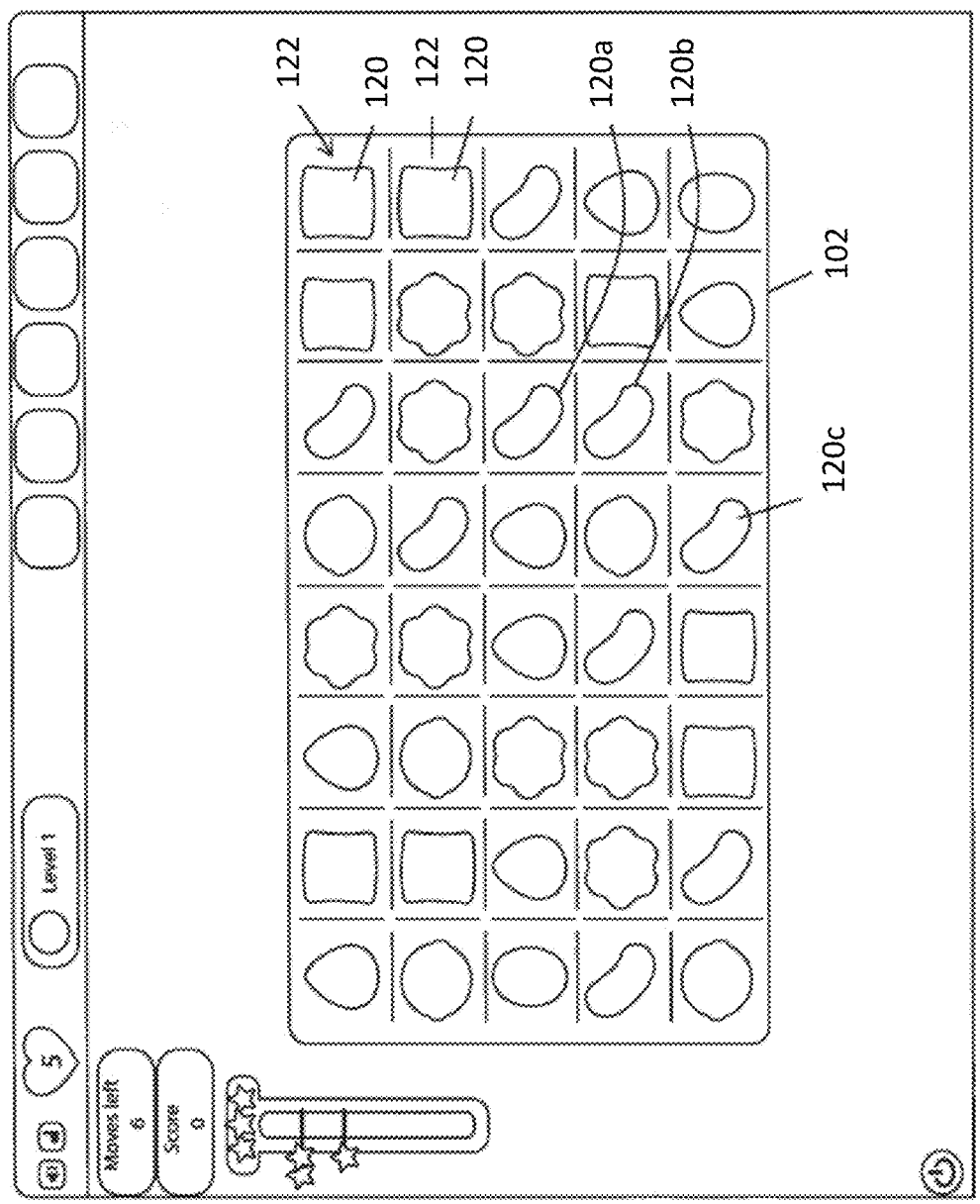
FIG. 5 shows an example embodiment of a game board for a switcher computer implemented game.

FIG. 5 shows schematically a match 3 switcher computer implemented game such as used in the Candy Crush™ type genre by the present applicant. FIG. 5 illustrates a game board 102 which is displayed on the display with a plurality of game elements 120. The game elements are for example one of six different shapes and colours. This is by way of example only. The appearance and/or number of different types of game element may be dependent on the game being played.

The aim of the game is to swop two game elements with each other to make moves on the game board. In this example, the game elements are in the shape of candies but this is by way of example only. To gain points the player has to make moves that create matches of at least three of the same type of game element. In doing so, the player may gain points. The matched game elements are removed from the game board. As a result new game elements may be provided. For example, the new game elements may fall into place from the top of the game board in order to fill any spaces created.

By way of example, assume in FIG. 5 that game element 120c is moved one place to the right to form a three-line match with game elements 120a and 120b. This has the effect of game board elements 120a, 120b and 120c being removed, creating a visual effect (animation) on the screen to indicate the removal of the game elements. The two game elements which were directly above game elements 120a will now fall downwards into the spaces created by the removal of game elements 120a, 120b and 120c. The game elements which fall downwards into the game board may be generated at random or pseudo randomly. The user then has a new game board on which to make a subsequent move.

Figure 6:
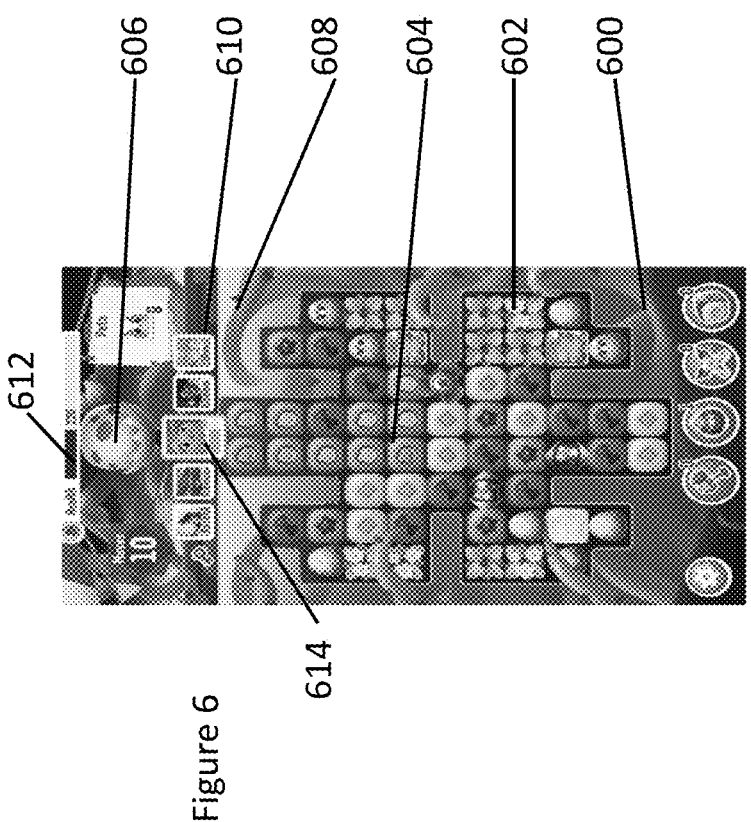
FIG. 6 shows an example embodiment of a game board for a clicker computer implemented game.

FIG. 6 shows an example of a 'clicker game' where the player matches adjacent game elements of the same type by selecting one or more of the game elements in the group of matching elements. One such known clicker game is of the Pet Rescue™ type. The aim of this game may be to for example release "pets" from the game board by removing game elements underneath the pets such that they fall to the bottom of the game board.

FIG. 6 shows an example of a game board 602 of a clicker game displayed on the display 600. The game board 602 comprises blocks or game elements of different shapes and colours. In some embodiments, such as shown in FIG. 6, the game elements have the same shape but are of different colours and have different items displayed on the shape. A given item may correspond to a different colour. There is a group of matching blocks 604 on the game board 602, in which each game element is directly adjacent to at least one other game element of a matching type. The user can select, via the user interface, this group for removal from the game board by clicking on any of the game elements within the group 604. Because the group 604 contains two or more matching game elements, all of the game elements in the group 604 are removed from the game board when the group is selected.

Once the game elements in the group 604 have been removed from the game board, the game board can be refilled in any suitable manner.

Some embodiments may provide an aspect which involves interaction with other players.

Some embodiments may provide an aspect which involves casual game play where a user is able to play a game as and when they like while at the same time having an aspect which allow the user to feel that they are playing alongside other players in real time. In some embodiments, this may be the case even when the user and one or more of the other players are not actually playing the computer implemented game at the same time.

Some embodiments may provide a computer implemented game where a group of two or more users cooperate to beat a common enemy or group. That common or group enemy requires game play input from more than one player to be defeated.

In some embodiments, a user will be part of a team or group of players. The groups may be temporary groups in some embodiments. The group may be created by the user or the user may be invited to join a group by one or more other users of the group. In some embodiments, the game server may create the group. In some embodiments, one or more of the players may be provided by a game bot. The game bot may use real game play for the one or more players provided by that game bot.

In some embodiments, the makeup of the group of users may be unique to each player. In other words, a different one of the group of users may see a different group of users when that different one of the users plays the game. This may be the case where data about the game play of the other users of the group is provided in advance. In this case the common enemy may be regarded as group enemy. The group enemy would be defeated based on the game play of the user and game play from the other users of that group. It should be appreciated that in the following, specific references to a common enemy should be understood to include a group enemy.

In embodiments, different users of the group would be part of the same group. In other words, each user of the group of users sees the same group of users. This may be the case where the game is played in real time.

In some embodiments, a user of the group of users is able to inflict damage on the common enemy. In some embodiments, a user of the group of user is able to inflict a relatively small amount of damage on the common enemy when for example playing a level of the computer implemented game. Accordingly, defeating the enemy may require the group of users to collectively defeat the common enemy by combining the damage inflicted by more than one user of the team of users.

By way of example only, the common enemy may be defeated after 100 moves but each player may have for a given level say 20 moves. These numbers are illustrative only.

In some embodiments, the common enemy will be defeated by the group playing one or sometimes more than one level associated with the common enemy.

When an enemy is defeated, in game rewards may be provided to one or more users. The reward which each player receives may be dependent on how much damage that particular player has done. In other embodiments, each user of the group may be provided with the same reward.

The in game reward may be any suitable reward. For example the in game reward may comprise one or more game boosters and/or in game currency.

One or more of these features may drive engagement by for example allowing a user to play a casual social game on their own as and when they like but experience being part of a team.

In some embodiments, not all of the levels of the game may be associated with the common enemy. In some embodiments, one or more of the levels of the game may be associated with the common enemy.

In some embodiments, all of the levels of the game may be associated the common enemy.

In some embodiments, when a user is playing a level where there is a common enemy, the common enemy may be graphically represented on the display. The common enemy may be graphically represented in any suitable way depending on the game context. For example, in the example shown in FIG. 6, the enemy is shown as a monster 606 with tentacles 608 extending toward and/or into the game board. However, the common enemy may be represented in any other suitable way in other embodiments.

In some embodiments, the common enemy may not have any interaction with the game board of a level. In some embodiments, the common enemy may simply have a graphical representation. In some embodiments, the common enemy may interact with the game board of the level during game play. By way of example, the common enemy may attempt to put a blocker on the game board during game play. The computer implemented game may be such that the attempts to put a blocker on the game board may be prevented by game play of the user.

Also shown in FIG. 6 is the other players 610 of the team who are attempting to defeat the common enemy. In some embodiments, a graphical representation of one or more or all of the other users of the team may be provided and/or of the user interacting with the user device on which the game is being played. For example, an avatar of one or more users of the team may be provided. In other embodiments, alternatively, or additionally, a list of one or more team members may be provided. In some embodiments, instead of the individual members of the team, a single graphical or other representation may be used to represent the contribution of the other members of the team and/or all the members of the team (including the current user) to the defeat of the common enemy.

In some embodiments, a given number of units or points may be required to defeat the common enemy. In some embodiments, the number of units may be a number of moves made by the team of users, a number of game blocks removed by the team of users, sets of N moves made by the team of users, sets of N blocks removed by the team of users, removal of a particular type or types of game elements by the team of users, removal of N of a particular type or types of game element by the team of users, associated with a given number of points acquired by the team of users and/or any other suitable criteria. The units may be alternatively or additionally be earned by achieving one or more game objectives. The units may alternatively or additionally be dependent on a score achieved by one or more of the team of users.

The number of units required to defeat the enemy may be displayed. For example, in the embodiment of FIG. 6, a so-called "health bar" 612 is shown. This may show the amount of units which are required to defeat the common enemy and/or the number of units which have already been acquired by the team of users in order to defeat the enemy.

In some embodiments, the amount of units which have been acquired by the user and/or one or more other users of the team which can be used to defeat the common enemy may be displayed.

In some embodiments, such as shown in FIG. 6, the user accumulates a given number of points via game play or satisfies some other given criteria associated with a value by playing the game. When the given number of points has been accumulated, these can be used against the common enemy. These given number of points may equate to one or more units. When the given number of points have been reached, an attack may be made on the enemy. A user health bar or the like 614 may be used to show how many of the given number of points have been accumulated by the user. The health bar is reset when the user reaches the given number of points.

In some embodiments, a user health bar or similar information may be alternatively or additionally displayed for one or more other players of the group of players. This will be updated during the playing of the level.

In some embodiments, there may be a one to one relationship between the points and the units. In other embodiments, there may not be a one to one relationship between the number of points and the number of units.

Figure 7:
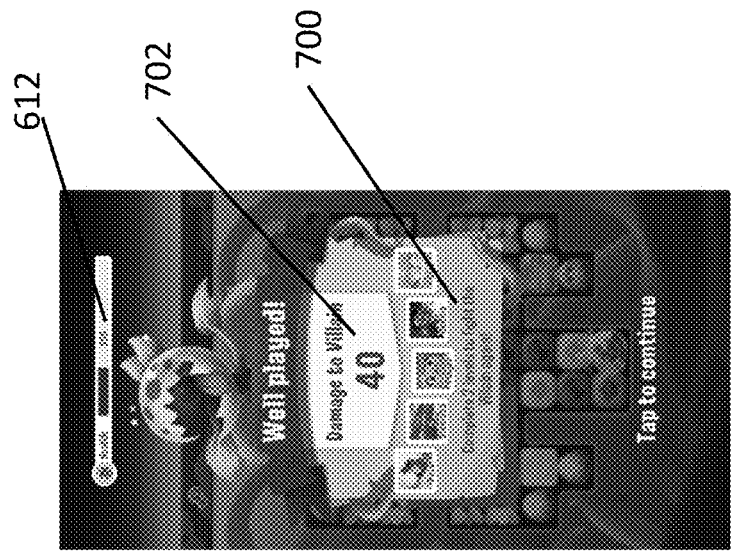
FIG. 7 shows an example of information displayed on a display when a common enemy of the computer implemented game is defeated at an end of a level of the computer implemented game.

In some embodiments, at the end of the level, the enemy may not have been defeated. Accordingly, the at least one processor may be configured to cause the display to display information to indicate that the group of players have not defeated the common enemy. For example, as shown in FIG. 7, the user may be provided with information displayed on the display which indicates that the enemy has not been defeated.

Alternatively or additionally, the user may be provided with information 700 indicating when the enemy can be fought again. In the example shown in FIG. 7, the user is required to complete 2 levels before the user is able to fight the common enemy again.

In some embodiments, if a level associated with the common enemy is played and the enemy is not defeated in that level, the user may replay that same level. However, when the user replays that level, the enemy is no longer provided in that level. In some embodiments, the player is able to fight the common enemy only in a subsequent level.

In other embodiments, if a level associated with the common enemy is played and the enemy is not defeated in that level, the user may replay that same level. In other embodiments when the user replays that level, the enemy is again provided in that level.

In some embodiments, information 702 about damage to the enemy may be provided. The damage which is displayed may be the damage inflicted by the player and/or the damage inflicted by the team of players.

In some embodiments, the information displayed may comprise information indicating what is required to defeat the enemy and/or the damage which has been inflicted on the enemy. As discussed in relation to FIG. 6, this may be provided in the form of a health bar 612 and/or in any other suitable form.

Figure 9:
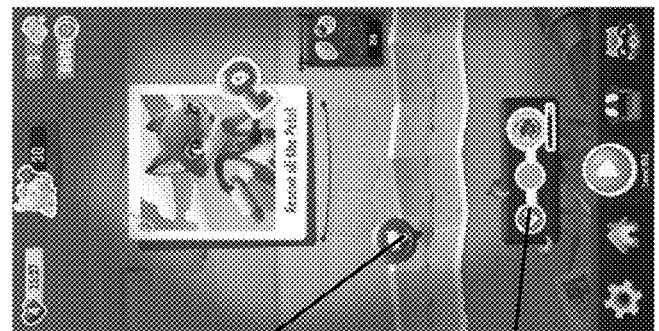
FIG. 9 shows an example of a map showing different levels and indicating which of the different levels is associated with common enemy.
Figure 8:
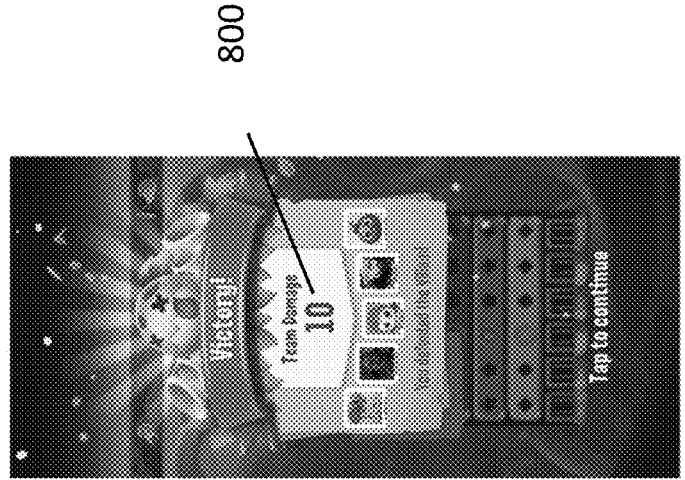
FIG. 8 shows an example of information displayed on a display when a common enemy of the computer implemented game is not defeated at an end of a level of the computer implemented game.

If at the end of the level, sufficient points or units have been acquired by the team in order to defeat the enemy, the at least one processor may be configured to cause the display to display information 800 indicating that the enemy has been defeated. An example of the information which is displayed on the display in some embodiments is shown in FIG. 8. In some embodiments optionally, information may be displayed indicating how much damage has been inflicted on the enemy by the user and/or all the team of users when playing that particular level.

Where the user is required to go to another level in order to fight the enemy again, a saga map or part of the saga map 900 such as shown in FIG. 9 may be displayed on the display. As can be seen, information 902 is displayed on the display which indicates to the user which is the next level in which the common enemy can be fought. In the example shown in FIG. 9, the user has completed one of the two further levels which are required before the user is able to fight the common enemy again. The user may be provided with information which indicates the number of levels which need to be completed before the next level is reached where the common enemy can be fought again. The information which is displayed may alternatively or additionally comprise a common enemy level indicator provided adjacent a node 900 on the map representing a level in which the common enemy can be fought.

In some embodiments, the common enemy may be provided in a level and in one or more subsequent levels until that common enemy has been defeated.

The levels in which the common enemy is provided may be fixed levels. In other embodiments, a common enemy may be provided in a level at random. In other embodiments, the common enemy may be provided in a level when one or more game conditions are satisfied.

Reference is made to FIG. 10 which shows a method of some embodiments.

In step S1, the user interface receives an input from a user selecting a common enemy level.

In step S2, the at least one processor is configured to cause the selected common enemy level to be displayed on the display. This is in response to the received user input at the user interface.

In step S3, the user interface is configured to receive user input to make a move.

In step S4, the at least one processor is configured to determine a value associated with the move. This value may be a score, a number of points, a number of removed blocks or any other suitable value.

In step S5, the at least one processor is configured to retrieve from at least one memory information about gameplay for one or more other users of the team. It should be appreciated that this information is received by a receiver of the user device from for example one or more game servers via the network. It should be appreciated that the step S5 can be performed at any suitable time. This may be performed prior to or at the same time as any of steps S1 to S4. In some embodiments the corresponding data for the corresponding move may be retrieved from memory for one or more of the other users of the team.

In some embodiments, the game data for the level associated with one or more of the users of the team may be received in advance of the user playing that level and stored in at least one memory. In other words the user device may have all game data for at least one of the users of the team and optionally all of the users of the team prior to the user playing the common enemy level.

In other embodiments, the game data from one or more other users may alternatively or additionally be received substantially in "real time" as the respective other user plays that level.

In step S6, an updated health value is determined by the at least one processor for the common enemy. The at least one processor may use the determined value and at least part of the retrieved information about gameplay for one or more other users of the team. This may use the game data associated with a corresponding move made by one or more of the other users of the team. For example the points acquired in a corresponding move made by one or more other users may be used. The determining of the updated health value may also use the health value prior to the making of the move by the user. The at least one processor may be configured to cause the display to display the updated health value for the common enemy. As the user plays the level, the health value may be increased. In some embodiments, the health level may be decreased as the user plays the level.

In step S7, the at least one processor may be configured to determine if there are any more moves left to be played in the level.

If there are remaining moves associated with the level, then the next step is step S3.

If there are no remaining moves left associated with the level, then the next step is step S8. In some embodiments, step S8 may take place before step S7 or at the same time. In some embodiments, steps S6 and S8 may be performed together. Where Step S8 is performed before step S7, it should be appreciated that step S9 will only take place if there are no further moves available. Where Step S8 is performed before step S7, it should be appreciated that step S10 may be performed if the common enemy has been defeated.

In step S8, the at least one processor is configured to determine if the common enemy has been defeated. This determination may be based on the health value. For example, it may be determined by the at least one processor that the health value has reached a particular value which indicates that the common enemy has been defeated.

If it is determined in step S8 that the common enemy has not been defeated, then in step S9, the at least one processor is configured to cause the display to display information indicating the next common enemy level where that same enemy can be attacked again. When the user plays the next common enemy level, the method shown in FIG. 10 may be repeated. However, the health level associated with the enemy at the end of this current common enemy level may be carried across to the next enemy level to continue the attack on the same enemy.

If it is determined in step S8 that the common enemy has been defeated, then the next step is step S10. In step S10, the at least one processor is configured to cause the display to display information indicating that the common enemy is defeated. In some embodiments, the at least one processor is configured to cause the display to display information indicating the next common enemy level. In this case, the health level associated with the enemy at the end of the current level is not carried across to the next common enemy level.

In some embodiments, the level may be associated with a level goal such as previously described. The level is considered completed if this level goal is satisfied. In some embodiments, when the level goal is satisfied, no further moves can be made.

In some embodiments, a determination may be made as to whether a move results in the level goal being satisfied. This may be part of for example step S7 or a step prior to step S7. When the level goal is determined to be satisfied, the determination as to if there are any moves left would determine that there are not moves left. In some embodiments, the determination of step S7 would be to determine if the level is completed. If the level is completed, then this may be followed by step S8 for example. If it is determined that the level is not completed, then there would a determination as to whether there are any moves left.

In some embodiments, the user is able to continue to use up moves even after a level goal has been satisfied.

It should be appreciated that is some embodiments, the at least one processor may be configured to determine during the playing of a level if the common enemy has been defeated, that is before the user has run out of moves. In some embodiments, this may end the level directly or indirectly. In some embodiments, even if the common enemy has been defeated, the user is able to continue playing the level.

In some embodiments, where the enemy is defeated before the level is completed, the user may be provided with a reward. This reward may be in addition or as an alternative to the reward provided for defeating the enemy. The reward may be such that the user is assisted to complete the layer. The reward may trigger an effect on the game board which helps the user to complete the objective of the level. By way of example only, the reward may be the removal of any game elements without a blocker layer and a blocker layer of any game element with one or more blocker layers.

Figure 11:
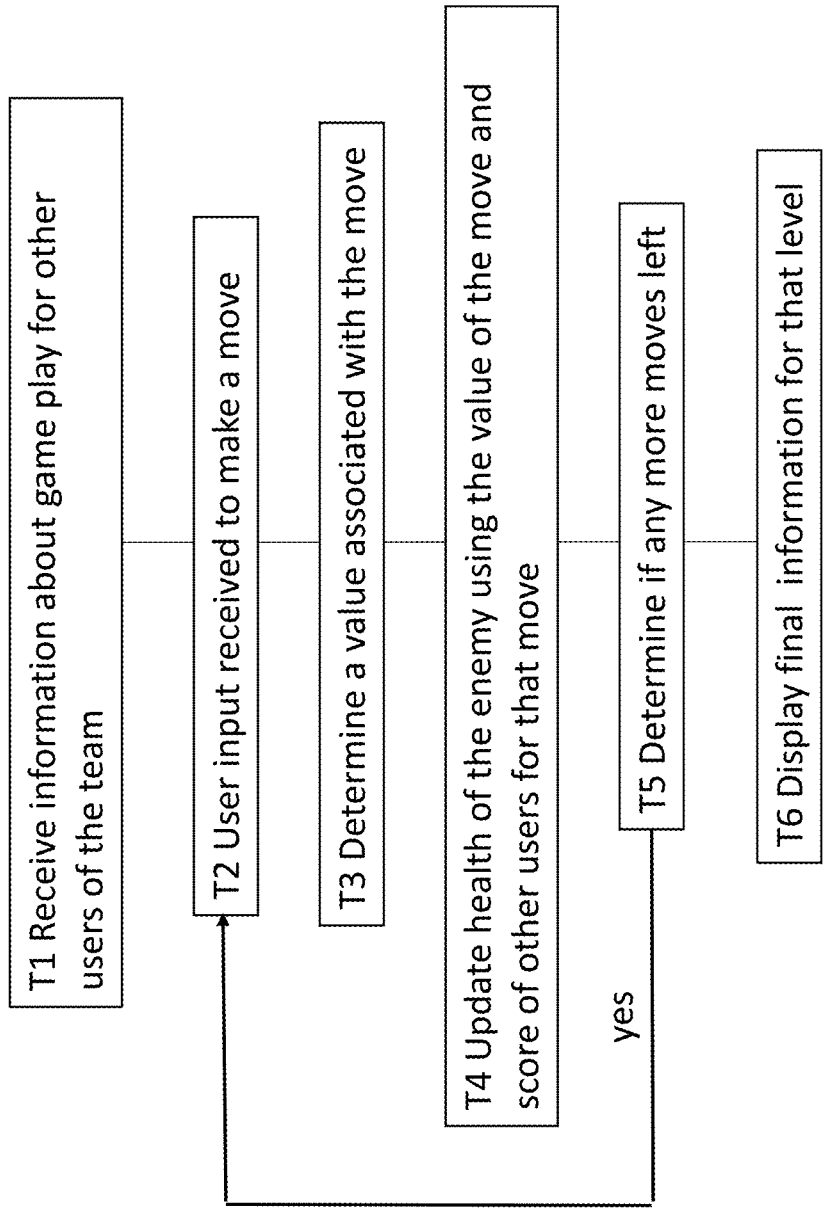
FIG. 11 shows an example of another method of some embodiments.

Reference is made to the FIG. 11 which shows a method of determining a score. The method of FIG. 10 may be modified to incorporate the method of FIG. 11.

In step T1, the receiver of the user device is configured to receive information about gameplay for other users of the team. In some embodiments, the information which is received comprises information about one or more or all of the moves made by one or more other users of the team of users. This information may be stored in at least one memory.

The information about gameplay may take any suitable form. In some embodiments for example, the information may comprise information indicating the score achieved by a user after a given move. In other embodiments, the information may comprise information indicating which one or more moves made by a given user of the team is associated with a particular value.

In step T2, the user interface is configured to receive user input to make a move.

In step T3, the at least one processor is configured to determine a value associated with the move. For example, the value may be an indication of the number of blocks removed and/or the score and/or the points achieved and/or any other suitable value.

In step T4, the at least one processor is configured to update the health of the enemy using the score of the user for that move and the score of one or more other users of the team for that move. The updated health of the enemy may be stored on the display.

In the step T5, a determination is made by the at least one processor if there are any moves remaining in the level. If so, the next step is step T2. If not, the next step is step T6.

In some embodiments, in step T6, the processor may be configured to cause the display to display a final score for that level. This may be the amount of health and/or number of units associated with the common enemy. Alternatively or additionally, the information which is displayed may be the score achieved by the user and/or one or more other users in the team.

In some embodiments, the current of score may be stored in a memory location and when a user makes a move, the value in that memory location may be updated. In some embodiments, the score associated with each individual move for the user may be stored.

The at least one processor may be configured to store in memory a current score (the score before the move being made) for one or more users of the team and update the score of the respective other user of the team for that particular move. The score for the respective other user may be updated using the received information for the move which may be retrieved from the at least one memory.

In some embodiments, the at least one processor may be configured to cause information associated with the score of the user and/or one or more of the team of other users to be displayed on the display individually and/or collectively. This may be done on a move by move basis so that the user is able to see when he or one of the other users of the team makes a good move.

In some embodiments, the at least one processor may be configured to cause information associated with the score of the user and/or one or more of the team of other users to be displayed on the display individually and/or collectively at the end of the level. The user may be able to view his contribution in comparison to one or more other users of the team.

Figure 12:
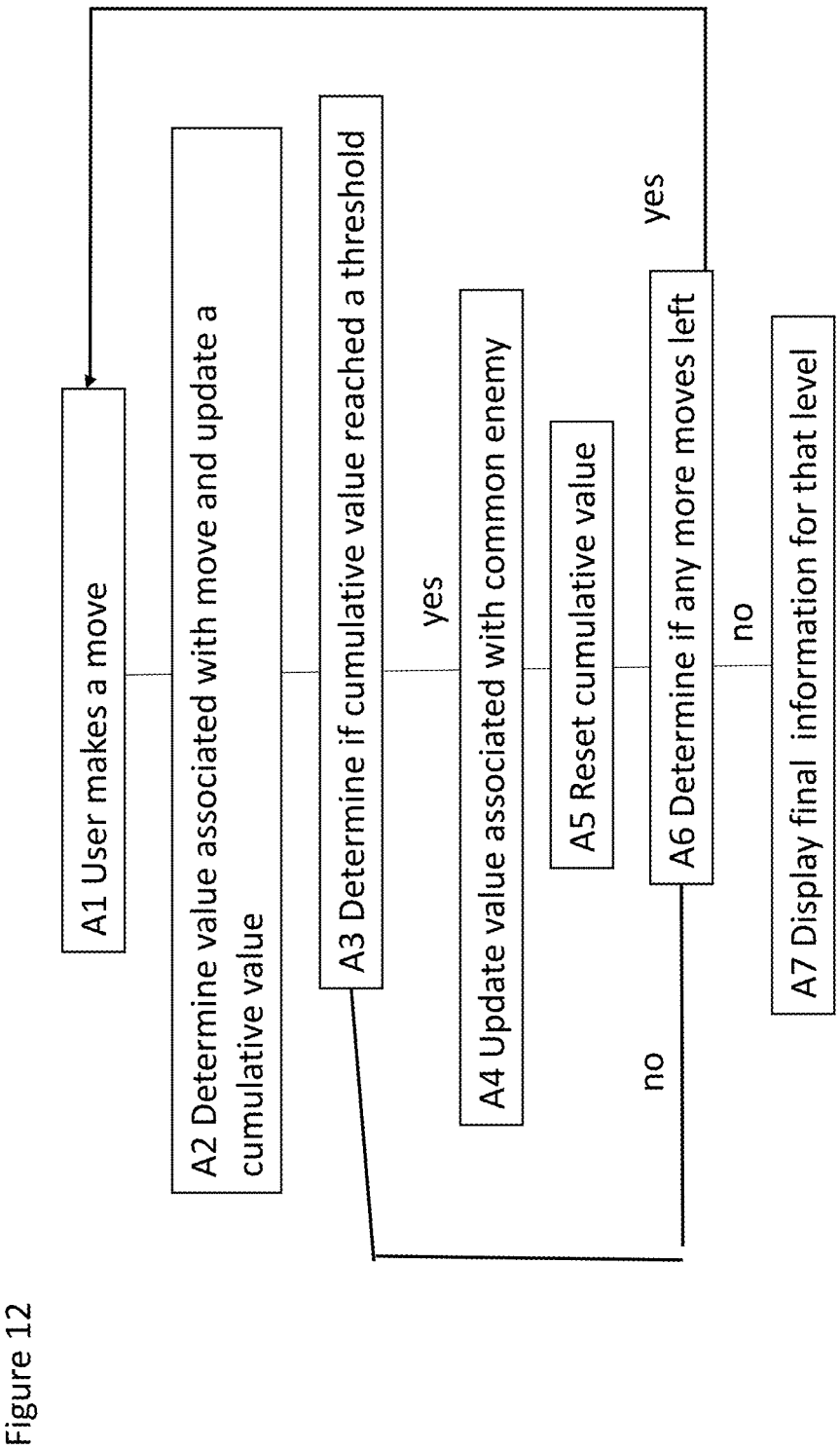
FIG. 12 shows an example of another method of some embodiments.

Reference is made to FIG. 12 which shows another method of some embodiments. The method of FIG. 10 may be modified to incorporate the method of FIG. 12. In some embodiments, the user is required to accumulate a given number of points or score before an attack can be made on the common enemy. An attack on the common enemy results in the health of the enemy changing such that fewer attacks are required to defeat the common enemy.

In step A1, the user interface is configured to receive an input from a user making a move.

In step A2, the at least one processor is configured to determine a value associated with that move and update a cumulative value for that user. For a first move of a level, the cumulative value may be set to 0 or to a predetermined value. If the level is a further common enemy level which is required to be played, optionally, the cumulative value may be the last cumulative value of the previous common enemy level.

In step A3, a determination is made by the at least one processor as to whether or not the cumulative value has reached a given threshold value.

If it is determined in step A3 that the cumulative value has reached the threshold value, the health value associated with the common enemy is updated by the at least one processor in step A4. This determination may result in the at least one processor causing the display to display an indication of this. For example, the common enemy may be shown as being hit and/or an updated health value of the common enemy may be displayed on the display and/or the health bar may be updated.

In some embodiments, the value associated with a corresponding move made by one or more users of the team may together be taken into account when determining if the cumulative value has reached the threshold.

In some embodiments, at least one other user of the team may have their own cumulative value. This is updated as the user makes his move using the game data associated with the corresponding move of the at least one other user. The at least one processor may be configured to show the common enemy being hit when the other user reaches their respective cumulative value.

In step A5, the cumulative value is reset by the at least one processor to the initial value if the cumulative value reached the threshold.

If it is determined in step A3 that the cumulative value has not reached the threshold value, then the next step is step A6. Step A6 also follows step A5.

In step A6, it is determined by the at least one processor if there are any remaining moves for the level. If yes, the next step is step A1.

If not, the next step is step A7 and the level is ended. The at least one processor may be configured to display final information for the level such as previously described.

The method of FIG. 12 may be used with the game data for one or more the other users of the team.

In some embodiments, each time the cumulative value is reached, an attack on the enemy may be provided and the health of the enemy may be updated. This information may be stored in memory. For example a count value in memory for a given user may be updated each time there is an attack by that user on the common enemy. In some embodiments, the number of attacks made by the user and/or one or other users may be determined. Information about the number of attacks made by the user and/or one or other users may be determined.

Figure 13:
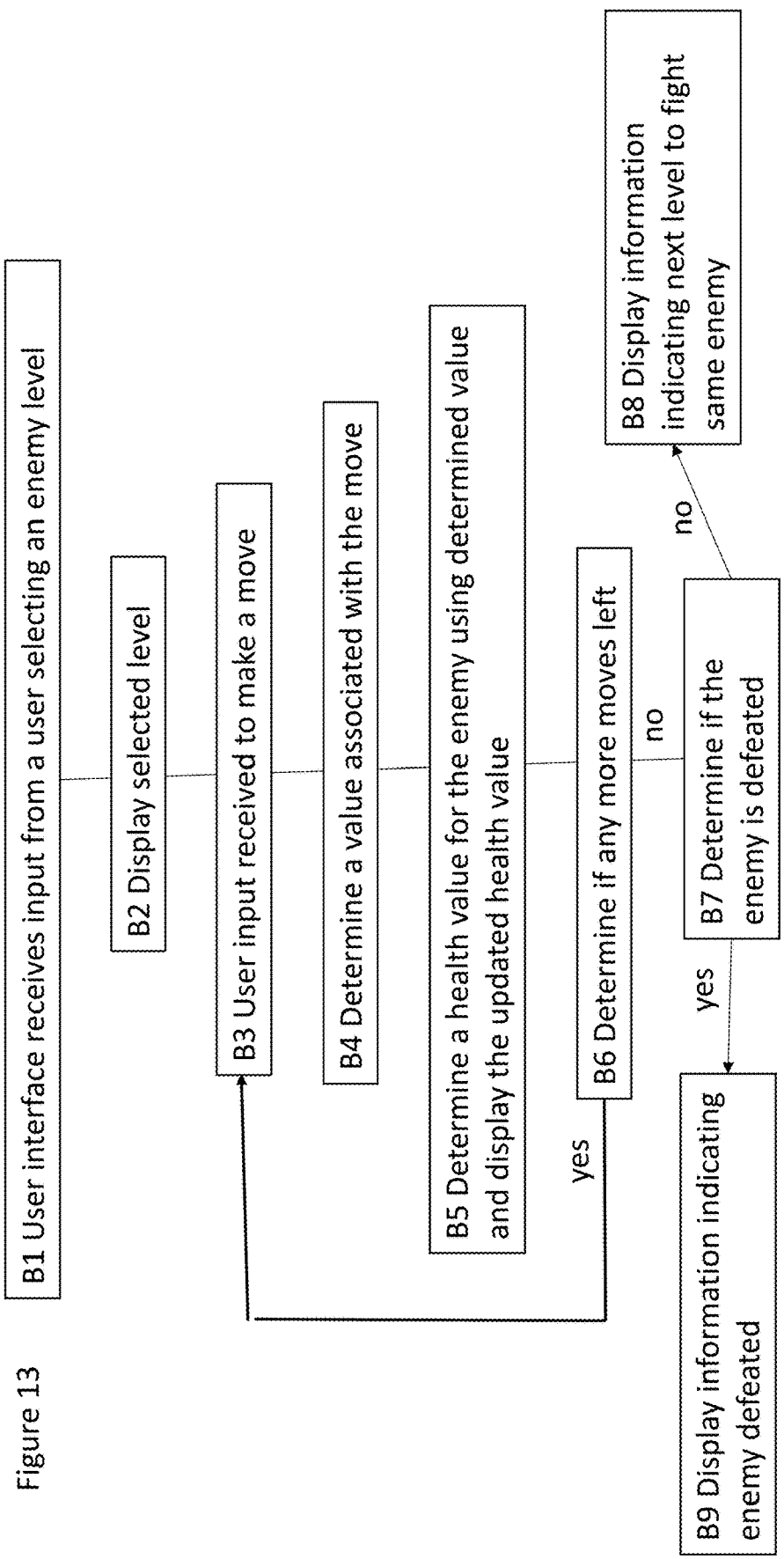
FIG. 13 shows an example of another method of some embodiments.

Various embodiments have been described in the context of where there is a team of players working together to defeat a common enemy. It should be appreciated that in other embodiments, there may be a single player mode for defeating an enemy. In this regard, reference is made FIG. 13 which shows a method of some embodiments.

In step B1, the user interface receives an input from a user selecting an enemy level.

In step B2, the at least one processor is configured to cause the selected level to be displayed on the display. This is in response to the received user input at the user interface.

In step B3, the user interface is configured to receive user input to make a move.

In step B4, the at least one processor is configured to determine a value associated with the move. This may be as previously described.

In step B5, an updated health value is determined by the at least one processor for the enemy. The at least one processor may use the determined value in this determination. The determining of the updated health value may use the health value prior to the making of the move by the user. The at least one processor may be configured to cause the display to display the updated health value.

In step B6, the at least one processor may be configured to determine if there are any more moves left to be played in the level.

If there are remaining moves associated with the level, then the next step is step B3.

If there are no remaining moves left associated with the level, then the next step is step B7. In step B7, the at least one processor is configured to determine if the enemy has been defeated. In some embodiments, step B7 may take place before step B6. In some embodiments, step B5 and B7 may be performed together. Step B7 may use the health value. For example, it may be determined by the at least one processor that the health value has reached a particular value which indicates that the enemy has been defeated. It should be noted that step B8 may only be performed when there are no remaining moves. Where Step B7 is performed before step B6, it should be appreciated that step B9 may be performed if the common enemy has been defeated. If it is determined in step B7 that the enemy has not been defeated, then in step B8, the at least one processor is configured to cause the display to display information indicating the next level in which the user can continue to attack the same enemy. When the user plays the next enemy level, the method shown in FIG. 13 may be repeated. However, the health level associated with the enemy at the end of this current enemy level will be carried across to the next level in which that same enemy can be attacked.

If it is determined in step B7 that the enemy has been defeated, then the next step is step B9. In step B9 the at least one processor is configured to cause the display to display information indicating that the enemy is defeated. In some embodiments, the at least one processor is configured to cause the display to display information indicating the next enemy level, such as previously described. In this case, the health level associated with the enemy at the end of the current level is not carried across to the next enemy level.

In some embodiments, the level may be associated with a level goal such as previously described. The level is considered completed if this level goal is satisfied. In some embodiments, when the level goal is satisfied, no further moves can be made.

In some embodiments, a determination may be made as to whether a move results in the level goal being satisfied. This may be part of for example step B6 or a step prior to step B6. When the level goal is determined to be satisfied, the determination as to if there are any moves left would determine that there are not moves left. In some embodiments, the determination of step B6 would be to determine if the level is completed. If the level is completed, then this may be followed by step B7 for example. If it is determined that the level is not completed, then there would a determination as to whether there are any moves left.

In some embodiments, the user is able to continue to use up moves even after a level goal has been satisfied.

Where the enemy is defeated before the level is completed, a reward such as previously discussed previously may be provided.

In various embodiments previously described, in both the multiplayer mode and the single player mode, the objective is to defeat an enemy. It should be appreciated that in other embodiments, a different goal may be provided. This goal is separate from the goal required to complete a level. This goal will be achieved by game play. In the context of the multiplayer scenario, this goal may require input from one or more or even all of the players of the team in order to be achieved. In the context of a single player game, the user may be required to play two or more levels associated with the particular goal in order to achieve that goal. The levels associated with the particular goal may optionally be interspersed with one or more other levels which do not contribute to the achieving of the goal. In some embodiments, only specific ones of the plurality of levels may be played in order to achieve or work towards the goal.

It should be appreciated that in some embodiments one or more levels may need to be played in order to achieve the goal and/or or defeat the enemy. In some embodiments, it may be necessary to play two or more levels in order to achieve the goal and/or defeat the enemy.

It should be appreciated that in some embodiments, the specific levels which are associated with the particular, non-level related, goal may be displayed in any suitable way. For example, where the different levels are represented in a map format, information or an indication may be provided adjacent the respective levels which are associated with achieving the goal or defeating an enemy.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, provide one or more methods of some embodiments. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program.

In general, the various embodiments may be implemented in hardware or special purpose circuits, software, logic or any combination thereof.

The computer medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium.

Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device configured to provide a computer implemented game comprising a plurality of different single player levels, some but not all of the single player levels of the computer implemented game providing a contribution to a group goal when played, the computer device comprising:
   an electronic display configured to electronically display on a game board game elements of a first instance of a first single player level of the computer implemented game, the first single player level of the computer implemented game providing a contribution to the group goal when played;
   a user interface configured to detect user input when a first user engages with one or more game elements displayed on said electronic display in a move of the first instance of the first single player level;
   a receiver configured to receive game data for one or more other users, the game data being associated with individual game play of the one or more other users each playing a respective different instance of the respective first single player level, providing a contribution to the group goal, of the computer implemented game; and
   at least one processor configured to cause the game elements on the game board displayed on the electronic display to be updated in response to the move of the first instance of the first single player level on the game board and further to:
   a) in response to user input received via the user interface engaging with one or more game elements displayed on said electronic display in the move of the first instance of the first single player level, determine a first contribution to the group goal from game data associated with the move;
   b) determine, based on the received game data, a second contribution to the group goal by the one or more other users from a respective move, corresponding to the move made by the first user, in each respective different instance of the first single player level; and
   repeat steps a) and b) in response to user input received via the user interface engaging with one or more game elements displayed on said electronic display in a next move of the first instance of the first single player level until one or more level conditions are satisfied, wherein:
   the at least one processor is configured to determine based on the first and second contributions of one or more moves in each respective different instance of the first single player level if the group goal is satisfied,
   the at least one processor is configured to cause the electronic display to electronically display on a map view a plurality of the single player levels of the computer implemented game and in response to user input received via the user interface hovering over a respective single player level that has been completed, causing the display to display a thumbnail for that level,
   when that group goal is not satisfied, the at least one processor is configured to cause the electronic display to display information on the map view indicating a second single player level of the plurality of levels which when played provides a contribution to the group goal, there being at least one third single player level of the plurality of levels between the first and second single player levels, the at least one third single player level not providing a contribution to the group goal when played, and
   the at least one processor unlocking the second single player level when the at least one processor has determined the at least one third single player level has been completed.

2. The computer device as claimed in claim 1, wherein the at least one processor is configured to update a goal value based on the first and second contribution.

3. The computer device as claimed in claim 2 wherein the at least one processor is configured to determine if the group goal is satisfied in dependence on the updated goal value.

4. The computer device as claimed in claim 3, wherein the at least one processor is configured to determine that the group goal is satisfied when the updated goal value reaches a given value.

5. The computer device as claimed in claim 1, wherein the at least one processor is configured to;
   determine a value associated with a move of the first instance of the first single player level made by the first user;
   update a cumulative value using the determined value associated with that move; and
   determine if the updated cumulative value satisfies a condition, and if so to update a goal value associated with the group goal.

6. The computer device as claim in claim 5, wherein the condition is that the cumulative value has reached a given value.

7. The computer device as claimed in claim 1, wherein the at least one processor is configured to cause the electronic display to electronically display group goal progress information and to cause the electronically displayed goal progress information to be updated in response to contributions of the first user and the one or more other users.

8. The computer device as claimed in claim 1, wherein the group goal comprises defeating an enemy.

9. The computer device as claimed in claim 1, comprising at least one memory, and when the at least one processor determines that the group goal is not satisfied, the at least one processor is configured to store a contribution value in the at least one memory, the at least one processor being configured to use the stored contribution value in an instance of the second player level together with contributions from one or more moves made by the first user and the one or more other users in each respective different instance of the second single player level when determining if the group goal is satisfied during play of the second single player level.

10. The computer device as claimed in claim 1, wherein the at least one processor is configured to cause the electronic display to electronically display information about a plurality of different single player levels and a respective indication of which one or more of the plurality of different single player levels is associated with the group goal.

11. The computer device as claimed in claim 10, wherein the information indicating the second single player level comprises information indicating a number of third single player levels which the first user needs to play to reach the second single player level.

12. The computer device as claimed in claim 1, wherein the game data comprises respective contribution information for the one or more other users.

13. The computer device as claimed in claim 1, wherein the at least one processor is configured to determine that the group goal is satisfied, and in response to cause the electronic display to electronically display information indicating that group goal is satisfied.

14. The computer device as claimed in claim 1, wherein the at least one processor is configured to determine that the group goal is satisfied, and in response to provide a game reward.

15. A computer implemented method performed in a computer device configured to provide a computer implemented game, the computer implemented game comprising a plurality of different single player levels, some but not all of the single player levels of the computer implemented game providing a contribution to a group goal when played, the method comprising:
  electronically displaying on an electronic display of the computer device game elements on a game board of a first instance of a first single player level providing a contribution to the group goal when played;
  detecting user input received via a user interface of the computer device when a first user engages with one or more game elements in a move of the first instance of the first single player level;
  receiving, by a receiver of the computer device, game data for one or more other users, the game data being associated with individual game play of the one or more other users each playing a respective different instance of the respective first single player level, providing a contribution to the group goal, of the computer implemented game;
  determining by at least one processor of the computer device configured to cause the game elements on the game board displayed on the electronic display to be updated in response to the move of the first instance of the first single player level on the game board;
  determining, by at lest one processor of the computer device:
  a) in response to user input received via the user interface engaging with one or more game elements in a move of the first instance of the first single player level, a first contribution to the group goal using game data associated with a move made by the first user when playing the first single player level;
  b) based on the received game data, a second contribution to the group goal by the one or more other users from a respective move, corresponding to the move made by the first user, in each respective different instance of the first single player level; and
  repeating steps a) and b) in response to user input received via the user interface engaging with one or more game elements in a next move of the first instance of the first single player level until one or more level conditions are satisfied,
  wherein the method comprises determining by the at least one processor based on the first and second contributions of one or more moves in each respective different instance of the first single player level if the group goal is satisfied,
  electronically displaying, by the electronic display, on a map view a plurality of the single player levels of the computer implemented game and in response to user input received via the user interface hovering over a respective single player level that has been completed, causing the electronic display to display a thumbnail for that level,
  when that group goal is not satisfied, causing, by the at least one processor, the electronic display to display information indicating on the map view a second single player level of the plurality of levels which when played provides a contribution to the group goal, there being at least one third single player level of the plurality of levels between the first and second single player levels, the at least one third single player level not providing a contribution to the group goal when played, and
  unlocking, by the at least one processor, the second single player level when the at least one processor has determined the at least one third single player level has been completed.

16. The computer method as claimed as claimed in claim 15, comprising updating by the at least one processor a goal value based on the first and second contribution.

17. The computer method as claimed as claimed in claim 15, comprising determining by the at least one processor a value associated with a move of the first instance of the first single player level made by the first user; updating by the at least one processor a cumulative value using the determined value associated with that move; and determining by the at least one processor if the updated cumulative value satisfies a condition, and if so updating a goal value associated with the group goal.

18. The computer method as claimed as claimed in claim 15, comprising causing by the at least one processor the electronic display to electronically display group goal progress information and causing the displayed goal progress information to be updated in response to contributions of the first user and the one or more other users.

19. The computer method as claimed as claimed in claim 15, wherein the group goal comprises defeating an enemy.

20. The computer method as claimed as claimed in claim 15, when the at least one processor determines that the group goal is not satisfied, storing in at least one memory of the computer device by the at least one processor a contribution, using by the at least one processor the stored contribution value in an instance of the second single player level associated with the group goal together with contributions from one or more moves made by the first user and the one or more other users in each respective different instance of the second single player level when determining if the group goal is satisfied during play of the second single player level.

21. The computer method as claimed as claimed in claim 15, comprising causing by the at least one processor the electronic display to electronically display information about a plurality of different single player levels and a respective indication of which one or more of the plurality of different single player levels is associated with the group goal.

22. The computer method as claimed as claimed in claim 15, comprising determining by the at least one processor that the group goal is satisfied, and in response causing the electronic display to electronically display information indicating that group goal is satisfied.

23. A non-transitory computer readable medium encoded with instructions for controlling a computing device configured to provide a computer implemented game, the computer implemented game comprising a plurality of different single player levels, some but not all of the single player levels of the computer implemented game providing a contribution to a group goal when played, the computer device comprising at least one processor and on which the instructions are executed to cause the following steps of:

> electronically displaying on an electronic display of the computer device game elements on a game board of a first instance of a first single player level providing a contribution to the group goal when played;
>
> detecting user input received via a user interface of the computer device when a first user engages with one or more game elements in a move of the first instance of the first single player level;
>
> receiving, by a receiver of the computer device, game data for one or more other users, the game data being associated with individual game play of the one or more other users each playing a respective different instance of the respective first single player level, providing a contribution to the group goal, of the computer implemented game;
>
> causing by at least one processor of the computer device the game elements on the game board displayed on the electronic display to be updated in response to the move of the first instance of the first single player level on the game board;
>
> determining, by at least one processor of the computer device:
>
> a) in response to user input received via the user interface engaging with one or more game elements in a move of the first instance of the first single player level, a first contribution to the group goal using game data associated with a move made by the first user when playing the first single player level;
>
> b) based on the received game data, a second contribution to the group goal by the one or more other users from a respective move corresponding to the move made by the first user, in each respective different instances of the first single player level; and
>
> repeating steps a) and b) in response to user input received via the user interface engaging with one or more game elements in a next move of the first instance of the first single player level until one or more level conditions are satisfied,
>
> wherein the method comprises determining by the at least one processor based on the first and second contributions of one or more moves in each respective different instance of the first single player level if the group goal is satisfied,
>
> causing by the at least one processor the electronic display to electronically display on a map view a plurality of the single player levels of the computer implemented game and in response to user input received via the user interface hovering over a respective single player level that has been completed, causing the display to display a thumbnail for that level,
>
> when that group goal is not satisfied, causing by the at least one processor the electronic display to display information on the map view indicating a second single player level of the plurality of levels which when played provides a contribution to the group goal, there being at least one third single player level of the plurality of levels between the first and second single player levels, the at least one third single player level not providing a contribution to the group goal when played, and
>
> unlocking, by the at least one processor, the second single player level when the at least one processor has determined the at least one third single player level has been completed.

\* \* \* \* \*